United States Patent
Tsai et al.

(10) Patent No.: US 11,309,952 B2
(45) Date of Patent: Apr. 19, 2022

(54) BEAMFORMING TRANSMISSION DEVICE AND METHOD

(71) Applicant: Industrial Technology Research Institute, Hsinchu (TW)

(72) Inventors: Shang-Ho Tsai, Hsinchu (TW); Yan-Yin He, Changhua County (TW); Hsiao-Chien Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/105,460

(22) Filed: Nov. 25, 2020

(65) Prior Publication Data
US 2021/0184753 A1 Jun. 17, 2021

Related U.S. Application Data

(63) Continuation-in-part of application No. 16/711,362, filed on Dec. 11, 2019, now Pat. No. 10,879,982.

(30) Foreign Application Priority Data

Oct. 21, 2020 (TW) .................................. 109136445

(51) Int. Cl.
*H04B 7/02* (2018.01)
*H04B 7/08* (2006.01)
*H04B 7/06* (2006.01)

(52) U.S. Cl.
CPC ........... *H04B 7/086* (2013.01); *H04B 7/0639* (2013.01); *H04B 7/088* (2013.01)

(58) Field of Classification Search
CPC ...... H04B 7/086; H04B 7/088; H04B 7/0639; H04B 17/12; H04B 7/0413; H04B 7/0617
(Continued)

(56) References Cited

U.S. PATENT DOCUMENTS 9,231,676 B2   1/2016 Zirwas et al.
10,009,073 B2  6/2018 Tsai et al.
(Continued)

FOREIGN PATENT DOCUMENTS

TW    I624159 B        5/2018
WO    WO 2012154090 A1 11/2012
WO    WO 2016185384 A1 11/2016

OTHER PUBLICATIONS

3rd Generation Partnership Project (3GPP). "Technical Specification Group Services and System Aspects; Enhancement for Unmanned Aerial Vehicles", 3GPP TR 22.829 V17.1.0, 2019, 126 pages, US.
(Continued)

*Primary Examiner* — Don N Vo

(57) ABSTRACT

A beamforming transmission device includes a baseband processing unit, at least one radio frequency unit, and an antenna array unit. The baseband processing unit provides at least one data stream and generates a control signal according to channel state information of at least two pieces of user equipment, wherein the data stream includes data of at least two pieces of user equipment. The radio frequency unit receives the data stream signal and generates at least one radio frequency signal. The antenna array unit receives the radio frequency signal and the control signal and adjusts gains and phases of the antenna array unit according to the control signal such that the radio frequency signal can be formed as a shared beamforming signal for transmitting to at least two pieces of user equipment, wherein the shared beamforming signal includes the data of at least two pieces of user equipment.

14 Claims, 10 Drawing Sheets

(58) Field of Classification Search
USPC .................................................. 375/267, 367
See application file for complete search history.

(56) References Cited

U.S. PATENT DOCUMENTS

| | | | |
|---|---|---|---|
| 2006/0274862 A1 | 12/2006 | Lui et al. | |
| 2012/0063500 A1 | 3/2012 | Wang et al. | |
| 2013/0244656 A1 | 9/2013 | Heo et al. | |
| 2014/0177607 A1* | 6/2014 | Li | H04W 52/42 370/336 |
| 2015/0200718 A1 | 7/2015 | Sajadieh et al. | |
| 2015/0282001 A1 | 10/2015 | Kwak et al. | |
| 2015/0341091 A1* | 11/2015 | Park | H04B 7/0617 375/267 |
| 2016/0135180 A1* | 5/2016 | Yuan | H01Q 21/065 370/329 |
| 2016/0241323 A1* | 8/2016 | Ko | H04B 7/0452 |
| 2017/0104517 A1 | 4/2017 | Kakishima et al. | |
| 2017/0257155 A1* | 9/2017 | Liang | H04L 25/0202 |
| 2018/0212653 A1 | 7/2018 | Miao et al. | |
| 2018/0343536 A1 | 11/2018 | Alrabadi | |
| 2019/0253123 A1 | 8/2019 | Su et al. | |
| 2019/0393948 A1* | 12/2019 | Zhao | H04B 7/0452 |
| 2020/0145074 A1 | 5/2020 | Kim et al. | |

OTHER PUBLICATIONS

3rd Generation Partnership Project (3GPP). "Technical Specification Group Radio Access Network; Study on New Radio (NR) to support non-terrestrial networks", 3GPP TR 38.811 V15.2.0, 2019, 47 pages, US.

Ho, Kuo-Chen, et al. "A Novel Multiuser Beamforming System With Reduced Complexity and Beam Optimizations", IEEE Transactions on Wireless Communications, Sep. 2019, pp. 4544-4557, vol. 18, No. 9, IEEE, US.

Yong, Su Khiong and Chia-Chin Chong. "An Overview of Multigigabit Wireless through Millimeter Wave Technology: Potentials and Technical Challenges", Hindawi Publishing Corporation, EURASIP Journal on Wireless Communications and Networking, 2006, 10 pages, vol. 2007, Hindawi Publishing Corporation, US.

Alkhateeb, Ahmed, et al. "Limited Feedback Hybrid Precoding for Multi-User Millimeter Wave Systems", IEEE Transactions on Wireless Communications, Nov. 2015, pp. 6481-6494, vol. 14, No. 11, IEEE, US.

Hur, Sooyoung, et al. "Millimeter Wave Beamforming for Wireless Backhaul and Access in Small Cell Networks", IEEE Transactions on Communications, Oct. 2013, pp. 4391-4403, vol. 61, No. 10, IEEE, US.

Ayach, Omar El, et al. "Spatially Sparse Precoding in Millimeter Wave MIMO Systems", IEEE Transactions on Communications, Mar. 2014, pp. 1499-1512, vol. 13, No. 3, IEEE, US.

Ayach, Omar El, et al. "The Capacity Optimality of Beam Steering in Large Millimeter Wave MIMO Systems" IEEE 13th International Workshop on Signal Processing Advances in Wireless Communications (SPAWC), 2012, 5 pages, IEEE, US.

Liu, Fan et al. "An Efficient Manifold Algorithm for Constructive Interference based Constant Envelope Precoding", IEEE Signal, Processing Letters, Oct. 2017, pp. 1542-1546, vol. 24, No. 10, IEEE, US.

3GPP TSG-RAN WG1 Meeting #96. "Clustering and Cluster Head Election Schemes for In-Coverage and Out-of-Coverage Ues", Ericsson, Mar. 2019, 6 pages, US.

Mohammed et al., "Constant envelope precoding for power-efficient downlink wireless communication in multi-user MIMO systems using large antenna arrays" 2012 IEEE International Conference on Acoustics, Speech and Signal Processing (ICASSP), Aug. 2012, pp. 2949-2952, IEEE, US.

Chaitanya et al., "Constant envelope signal space diversity", 2014 IEEE International Conference on Acoustics, Speech and Signal Processing (ICASSP), Jul. 2014, pp. 3147-3151, IEEE, US.

Mohammed et al., "Constant-Envelope Multi-User Precoding for Frequency-Selective Massive MIMO Systems", IEEE Wireless Communications Letters, Oct. 2013, pp. 547-550, vol. 2, No. 5, IEEE, US.

3GPP TS 36.213 . "Evolved Universal Terrestrial Radio Access (E-UTRA); Physical layer procedures", European Telecommunications Standards Institute, V. 15.2.0, Oct. 2018.

Chen et al., "Improved Constant Envelope Multiuser Precoding for Massive MIMO Systems", IEEE Communications Letters, Aug. 2014, pp. 1311-1314, vol. 18, No. 8, IEEE, US.

Mollén et al., "Multiuser MIMO precoding with perantenna continuous-time constantenvelope constraints" 2015 IEEE 16th International Workshop on Signal Processing Advances in Wireless Communications (SPAWC), Aug. 2015, pp. 261-265, IEEE, US.

Mohammed et al., "Per-Antenna Constant Envelope Precoding for Large Multi-User MIMO Systems", IEEE Transactions on Communications, Mar. 2013, pp. 1059-1071, vol. 61, No. 3, IEEE, US.

Mohammed et al., "Power-efficient downlink communication using large antenna arrays: The doughnut channel", 2012 IEEE International Conference on Communications (ICC), Nov. 2012, pp. 2145-2150, IEEE, US.

Pan et al., "Signal region characterization and exact phase recovery for constant envelope precoding in single-user large-scale MISO channels", 2013 IEEE International Conference on Acoustics, Speech and Signal Processing, Oct. 2013, pp. 5065-5069, IEEE, US.

* cited by examiner

BEAMFORMING TRANSMISSION DEVICE AND METHOD

CROSS REFERENCE TO RELATED APPLICATIONS

This application is a Continuation-In-Part of U.S. patent application Ser. No. 16/711,362, filed Dec. 11, 2019, the entirety of which is incorporated by reference herein.

This application claims priority of Taiwan Patent Application No. 109136445, filed on Oct. 21, 2020, the entirety of which is incorporated by reference herein.

TECHNICAL FIELD

The present disclosure relates to a beamforming transmission device and method.

BACKGROUND

Current designs of traditional beamforming transmission devices employ a plurality of radio frequency (RF) chains to support a plurality of pieces of user equipment. Each beam of a beamforming transmission device with the traditional design has only a single beamforming direction and is concentrated in a single direction, so that each beam can only support one piece of user equipment at a time. That is, using a traditional design for a beamforming transmission device, the number of RF chains must be equal to or greater than the number of the plurality of pieces of user equipment. Therefore, the traditional design of the beamforming transmission device may increase the design complexity and power consumption.

Accordingly, how to effectively reduce the design complexity and power consumption of the design of the beamforming transmission device has become an important issue.

SUMMARY

The present disclosure provides a beamforming transmission device, which includes a baseband processing unit, the at least one radio frequency unit and an antenna array unit. The baseband processing unit is configured to provide the at least one data stream and generate a control signal according to channel state information of the at least two pieces of user equipment (UEs), wherein the data stream includes data of the at least two pieces of user equipment. The radio frequency unit is coupled to the baseband processing unit, and configured to receive the data stream signal and generate the at least one radio frequency signal. The antenna array unit is coupled to the at least one radio frequency unit and the baseband processing unit. The antenna array unit is configured to receive the radio frequency signal and the control signal and adjust gains and phases of the antenna array unit according to the control signal such that the radio frequency signal can be formed as a shared beamforming signal for transmitting to the at least two pieces of user equipment, wherein the shared beamforming signal includes the data of the at least two pieces of user equipment.

The present disclosure provides a beamforming transmission method, which includes the following steps. A baseband processing unit is used to provide the at least one data stream and generate a control signal according to channel state information of the at least two pieces of user equipment (UEs), wherein the data stream includes data of the at least two pieces of user equipment. The at least one radio frequency unit is used to receive the data stream signal and generate the at least one radio frequency signal. An antenna array unit is used to receive the radio frequency signal and the control signal and adjust gains and phases of the antenna array unit according to the control signal such that the radio frequency signal can be formed as a shared beamforming signal for transmitting to the at least two pieces of user equipment, wherein the shared beamforming signal includes the data of the at least two pieces of user equipment.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
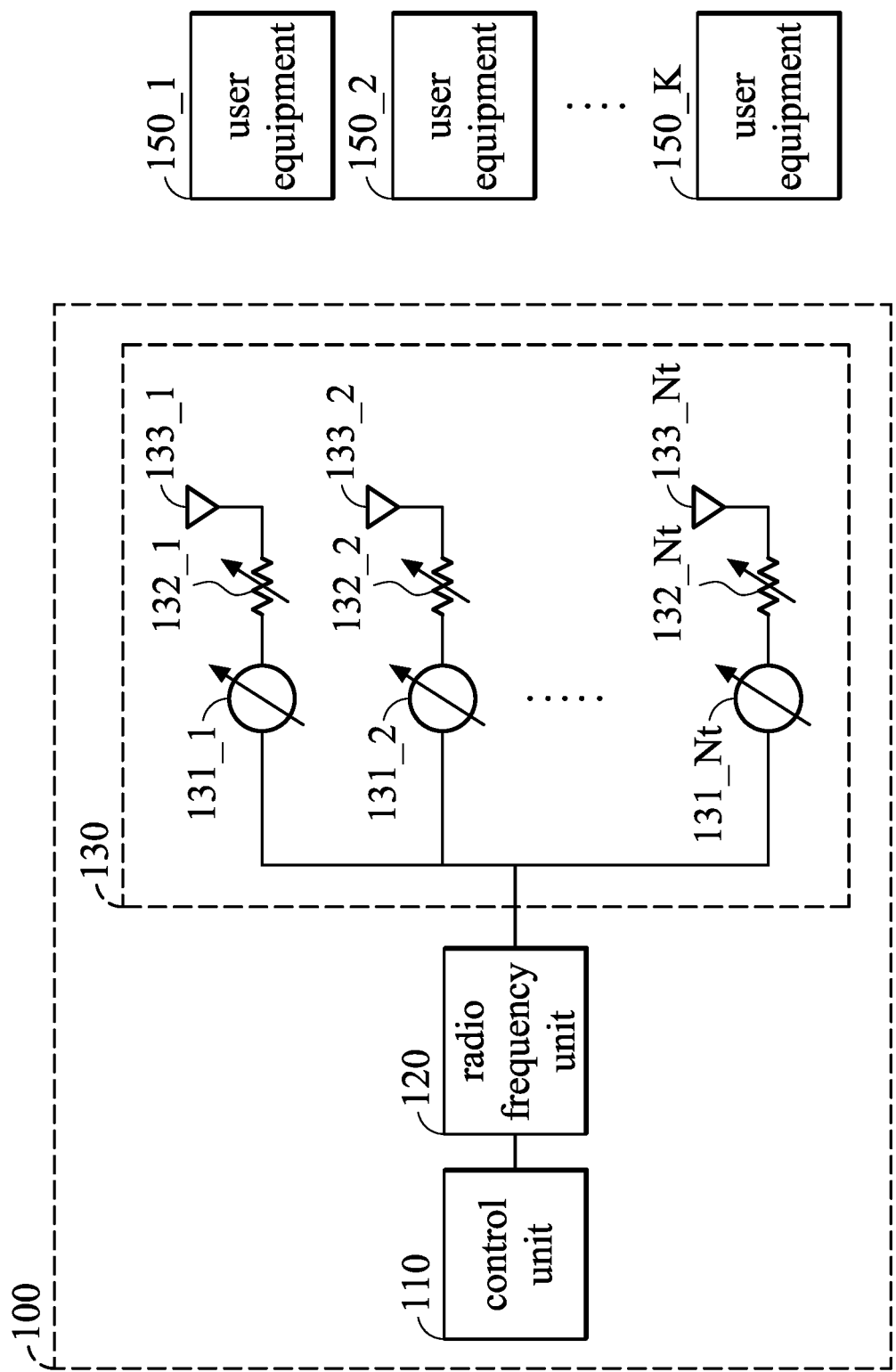
FIG. 1 is a schematic view of a beamforming transmission device according to an embodiment of the present disclosure.

FIG. 1 is a schematic view of a beamforming transmission device according to an embodiment of the present disclosure. In the embodiment, the beamforming transmission device 100 is configured to provide a beamforming signal to k pieces of user equipment (UEs) 150_1~150_K, wherein k is a positive integer greater than 1 (i.e., K≥2). For example, the beamforming transmission device 100 provides the beamforming signal to the pieces of user equipment 150_1~150_K through a time division multiple access (TDMA).

The beamforming transmission device 100 and the pieces of user equipment 150_1~150_K form a cluster, and the beamforming transmission device 100 is a cluster header in the cluster. In addition, the beamforming transmission device 100 may be a relay device or a communication device, for example, disposed on a mobile phone, a vehicle, a boat, a train, etc. The pieces of user equipment 150_1~150_K may be communication devices, for example, disposed on a mobile phone, a vehicle, a boat, a train, etc. The pieces of user equipment 150_1~150_K are disposed in different positions.

Please refer to FIG. 1. The beamforming transmission device 100 includes a control unit 110, a radio frequency unit 120 and a signal transmission unit 130.

The control unit 110 is configured to receive a radio frequency signal and channel state information of the pieces of user equipment 150_1~150_K. In the embodiment, the radio frequency signal is generated by a remote device, such as a low-orbit satellite, a base station, etc. Then, the control unit 110 may generate a control signal according to the radio frequency signal and the channel state information of the pieces of user equipment 150_1~150_K.

The radio frequency unit 120 is coupled to the control unit 110. The radio frequency unit 120 is configured to receive the control signal and generate a beamforming signal according to the control signal. In the embodiment, the radio frequency unit 120 is, for example, a radio frequency (RF) chain.

The signal transmission unit 130 is coupled to the radio frequency unit 120. The signal transmission unit 130 is configured to transmit the beamforming signal to the pieces of user equipment 150_1~150_K.

In the embodiment, the signal transmission unit 130 includes a plurality of phase shifters 131_1~131_Nt, a plurality of gain units 132_1~132_Nt, and a plurality of antenna units 133_1~133_Nt, wherein Nt is a positive integer greater than 1.

The phase shifters 131_1~131_Nt are coupled to the radio frequency unit 120. The phase shifters 131_1~131_Nt are configured to adjust the phase of the beamforming signal.

The gain units 132_1~132_Nt are coupled to the corresponding phase shifters 131_1~131_Nt, respectively. For example, the gain unit 132_1 is coupled to the corresponding phase shifter 131_1, the gain unit 132_2 is coupled to the phase shifter 131_2, . . . , the gain unit 132_Nt is coupled to the phase shifter 131_Nt. The gain units 132_1~132_Nt are configured to adjust the gain of the beamforming signal.

The antenna units 133_1~133_Nt are coupled to the corresponding gain units 132_1~132_Nt, respectively. For example, the antenna unit 133_1 is coupled to the corresponding gain unit 132_1, the antenna unit 133_2 is coupled to the corresponding gain unit 132_2, . . . , the antenna unit 133_Nt is coupled to the corresponding gain unit 132_Nt. The antenna units 133_1~133_Nt are configured to transmit the beamforming signal to the pieces of user equipment 150_1~150_K.

When the control unit 110 obtains the channel state information of the pieces of user equipment 150_1~150_K, the control unit 110 may calculate, for example, gains corresponding to the pieces of user equipment 150_1~150_K according to a cost function of the channel state information of the pieces of user equipment 150_1~150_K. In the embodiment, the channel state information of the pieces of user equipment 150_1~150_K may include the following equations: equation (1) and equation (2).

$$h_k^T = \sqrt{\frac{N_t}{L}} \sum_{l=1}^{L} \alpha_l a_t(\theta_l)^H, \tag{1}$$

$$H = [h_1 \ h_2 \ \cdots \ h_K]^T, \tag{2}$$

wherein $h_k^T$ (k=1~K) indicates mmWave channel state information of kth piece of user equipment 150_1~150_K, H indicates a matrix of the channel information, L indicates a number of paths corresponding to each piece of user equipment, $\alpha_l$ indicates a complex gain of lth path, $\theta_l$ is an angle of departure (AOD) of lth path, $N_t$ indicates a number of antenna units 133_1~133_Nt, $a_t(\theta_l)$ indicates a steering vector with beam angle $\theta_l$, a superscript "H" in equation (1) indicates a Hermitian operation of a matrix.

In addition, $a_t(\theta_l)$ may be expressed by equation (3).

$$a_t(\theta_l) = \frac{1}{\sqrt{N_t}} \left[1, \ e^{j\frac{2\pi}{\lambda}d \sin(\theta_l)}, \ \ldots \ , e^{j(N_t-1)\frac{2\pi}{\lambda}d \sin(\theta_l)}\right]^T, \tag{3}$$

wherein $\lambda$ indicates a wavelength of mmWave frequency, d indicates an inter-element spacing.

In one embodiment, the cost function may include a maximization of the minimum of data rates of the pieces of user equipment 150_1~150_K. The maximization of the minimum of data rates of the pieces of user equipment 150_1~150_K may be expressed as the following equations: equation (4), equation (5) and equation (6).

$$\max \min(R_1, R_2, \ldots, R_K), \tag{4}$$

$$R_k = \log_2\left(1 + \frac{g_k^2}{\sigma^2}\right), \tag{5}$$

$$g_1^2 \|q_1\|^2 + g_2^2 \|q_2\|^2 + \ldots + g_K^2 \|q_K\|^2 = P_T, \tag{6}$$

wherein, $R_1, R_2, \ldots, R_K$ respectively indicate the data rates of k pieces of user equipment 150_1~150_K, $g_k$ (k=1~K) indicates gains corresponding to the k pieces of user equipment 150_1~150_K, $\sigma$ indicates a standard deviation of a noise, $[q_1 \ q_2 \ \ldots \ q_K] = H^H (HH^H)^{-1}$, and $P_T$ and indicates a total transmission power of the radio frequency signal. Then, the gains corresponding to the pieces of user equipment 150_1~150_K may be easily derived according to equation (5) and equation (6).

In another embodiment, the cost function may include a maximization of the sum rate of the pieces of user equipment 150_1~150_K, wherein the sum rate is the total rate of individual piece of user equipment 150_1~150_K. The maximization of the sum rate of the pieces of user equipment 150_1~150_K may be expressed as the following equations: equation (7) and equation (8).

$$\max \sum_{k=1}^{K} \log_2\left(1 + \frac{g_k^2}{\sigma^2}\right), \tag{7}$$

$$g_1^2\|q_1\|^2 + g_2^2\|q_2\|^2 + \ldots + g_K^2\|q_K\|^2 = P_T, \tag{8}$$

wherein, k indicates the pieces of user equipment 150_1~150_K, $g_k$ (k=1~K) indicates gains corresponding to the k pieces of user equipment 150_1~150_K, σ indicates the standard deviation of the noise, $[q_1 \; q_2 \; \ldots \; q_K] = H^H (HH^H)^{-1}$, and $P_T$ indicates the total transmission power of the radio frequency signal.

Then, a Lagrange multiplier is applied, so that equation (7) and equation (8) may be derived using equation (9).

$$L(g_1, g_2, \ldots, g_K, \lambda) = \tag{9}$$

$$\sum_{k=1}^{K} \log_2\left(1 + \frac{g_k^2}{\sigma^2}\right) + \lambda(g_1^2\|q_1\|^2 + \ldots + g_K^2\|q_K\|^2 + \text{cross terms} - P_T),$$

wherein $L(g_1, g_2, \ldots, g_K, \lambda)$ indicates the Lagrange multiplier, λ indicates a template variable that appears when solving the optimization problem using the Lagrange multiplier.

Assuming that the "cross terms" are approximately equal to 0, the following equations, equation (10) and equation (11), are obtained.

$$\frac{\partial L}{\partial g_k} = \frac{1}{\ln(2)\left(1 + \frac{g_k^2}{\sigma^2}\right)} \frac{2g_k}{\sigma^2} + \lambda(2g_k\|q_k\|^2) = 0, \tag{10}$$

$$\lambda = \frac{-1}{\ln(2)(\sigma^2 + g_k^2)\|q_k\|^2}. \tag{11}$$

Then, assuming that λ=λ, the following equations, equation (12) and equation (13), are obtained.

$$(\sigma^2 + g_k^2)\|q_k\|^2 = (\sigma^2 + g_l^2)\|q_l\|^2, \tag{12}$$

$$g_k^2 = g_l^2 \frac{\|q_l\|^2}{\|q_k\|^2} + \sigma^2\left(\frac{\|q_l\|^2 - \|q_k\|^2}{\|q_k\|^2}\right), \tag{13}$$

wherein $g_l$ indicates an equivalent received gain due to beamforming, $q_l$ indicates lth column of the matrix $H^H(HH^H)^{-1}$.

The following equation (14) is obtained to according to equation (13).

$$Kg_l^2\|q_l\|^2 + \sigma^2\sum_{k=1}^{K}(\|q_l\|^2 - \|q_k\|^2) = P_T. \tag{14}$$

Then, the gains corresponding to the pieces of user equipment 150_1~150_K may be easily derived according to equation (14).

After the control unit 110 obtains the gains corresponding to the pieces of user equipment 150_1~150_K, the control unit 110 may calculate a precoding vector according to the gains corresponding to the pieces of user equipment 150_1~150_K and the channel state information of the pieces of user equipment 150_1~150_K. In the embodiment, the precoding vector is expressed by equation (15).

$$f = H^H(HH^H)^{-1}\begin{bmatrix}g_1\\g_2\\\vdots\\g_K\end{bmatrix}, \tag{15}$$

wherein f indicates a precoding vector and $f \in \mathbb{C}^{N_t \times 1}$, H indicates the mmWave channel state information of k pieces of user equipment 150_1~150_K, $g_1$~$g_K$ indicate gains corresponding to the k pieces of user equipment 150_1~150_K.

After the control unit 110 obtains the precoding vector f, the control unit 110 may generate a control signal according to the precoding vector. In the embodiment, the received signal of kth piece of user equipment 150_1~150_K may be expressed by equation (16).

$$r_k = h_k^T f s + n_k, \tag{16}$$

wherein $r_k$ indicates the received signal of kth piece of user equipment 150_1~150_K, s indicates a symbol and $s \in \mathbb{C}^{1 \times 1}$, $n_k$ indicates a received noise.

Accordingly, the beamforming transmission device 100 may use one radio frequency unit 120 to generate the beamforming signal for the pieces of user equipment. Therefore, the switching speed, the design complexity, and the power consumption of the beamforming transmission device 100 may be effectively reduced.

Figure 2:
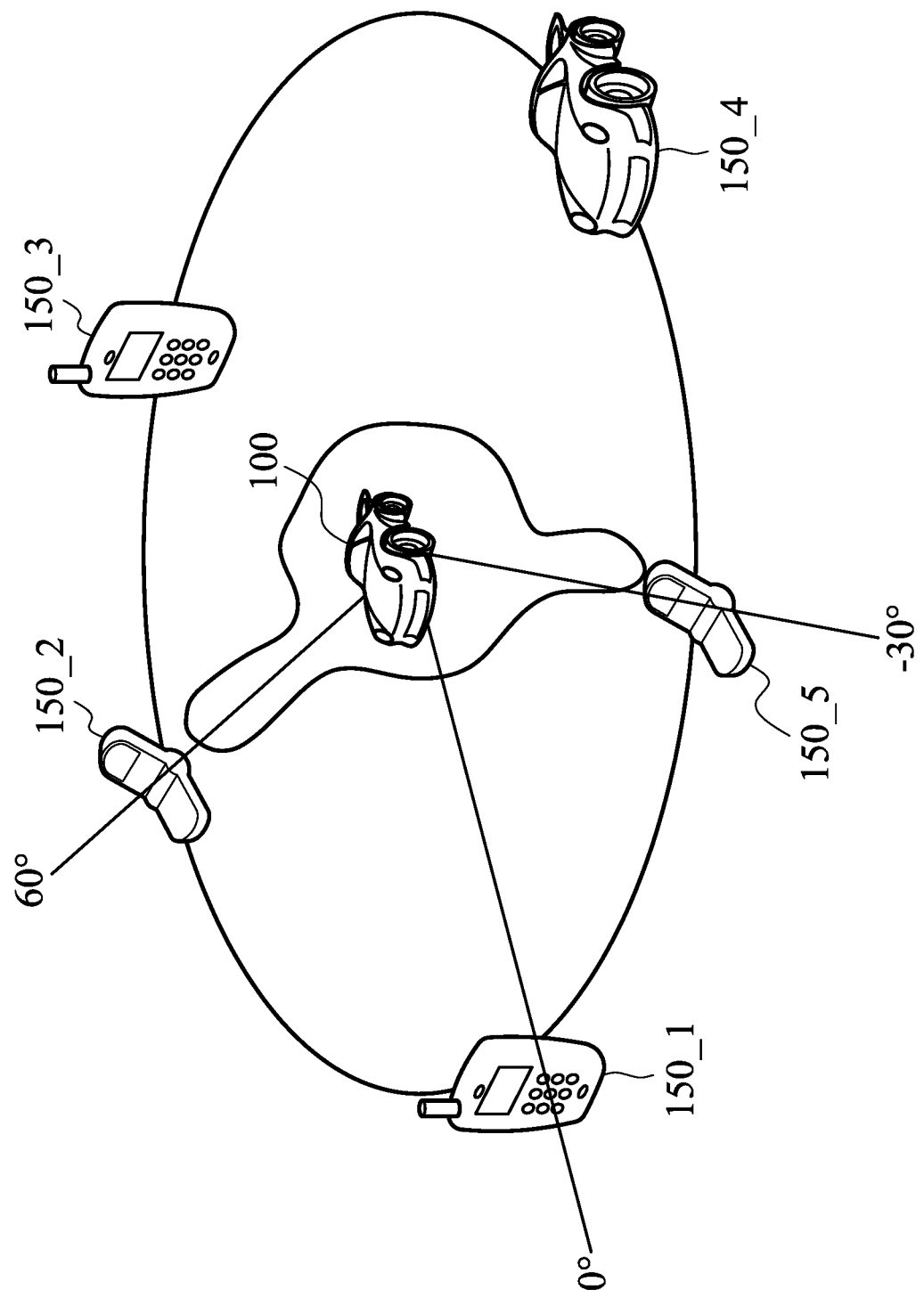
FIG. 2 is a schematic view of an operation between the beamforming transmission device and a plurality of pieces of user equipment according to an embodiment of the present disclosure.

FIG. 2 is a schematic view of an operation between the beamforming transmission device and a plurality of pieces of user equipment according to an embodiment of the present disclosure. In the embodiment, the beamforming transmission device 100 and the pieces of user equipment 150_1~150_5 form a cluster, and the beamforming transmission device 100 is a cluster header of the cluster. Assume that the piece of user equipment 150_2 and the piece of user equipment 150_5 need to communicate with the beamforming transmission device 100. The number of antenna units of the beamforming transmission device 100 is 64, and there are 5 paths. The piece of user equipment 150_2 and the piece of user equipment 150_5 are disposed at 60 degrees and −30 degrees related to the beamforming transmission device 100.

Then, the control unit 110 may calculate gains corresponding to the piece of user equipment 150_2 and the piece of user equipment 150_5 according to the cost function of the channel state information of the piece of user equipment 150_2 and the piece of user equipment 150_5. In the embodiment, equation (1) and equation (2) may be derived using the following equations, equation (17) and equation (18).

$$H = [h_1 \; h_2]^T, \tag{17}$$

$$h_k^T = \sqrt{\frac{64}{5}}\sum_{l=1}^{5}\alpha_l a_t(\theta_l)^H, \tag{18}$$

wherein $h_1^T$ and $h_2^T$ indicate the mmWave channel state information of the piece of user equipment 150_2 and the piece of user equipment 150_5. According to equations (3)~(6) and (15)~(18) or equations (3) and (7)~(18), the control unit 110 may generate a control signal, so that the beamforming transmission device 100 may generate the corresponding beamforming signal to the piece of user equipment 150_2 and the piece of user equipment 150_5 through the radio frequency unit 120.

Figure 3:
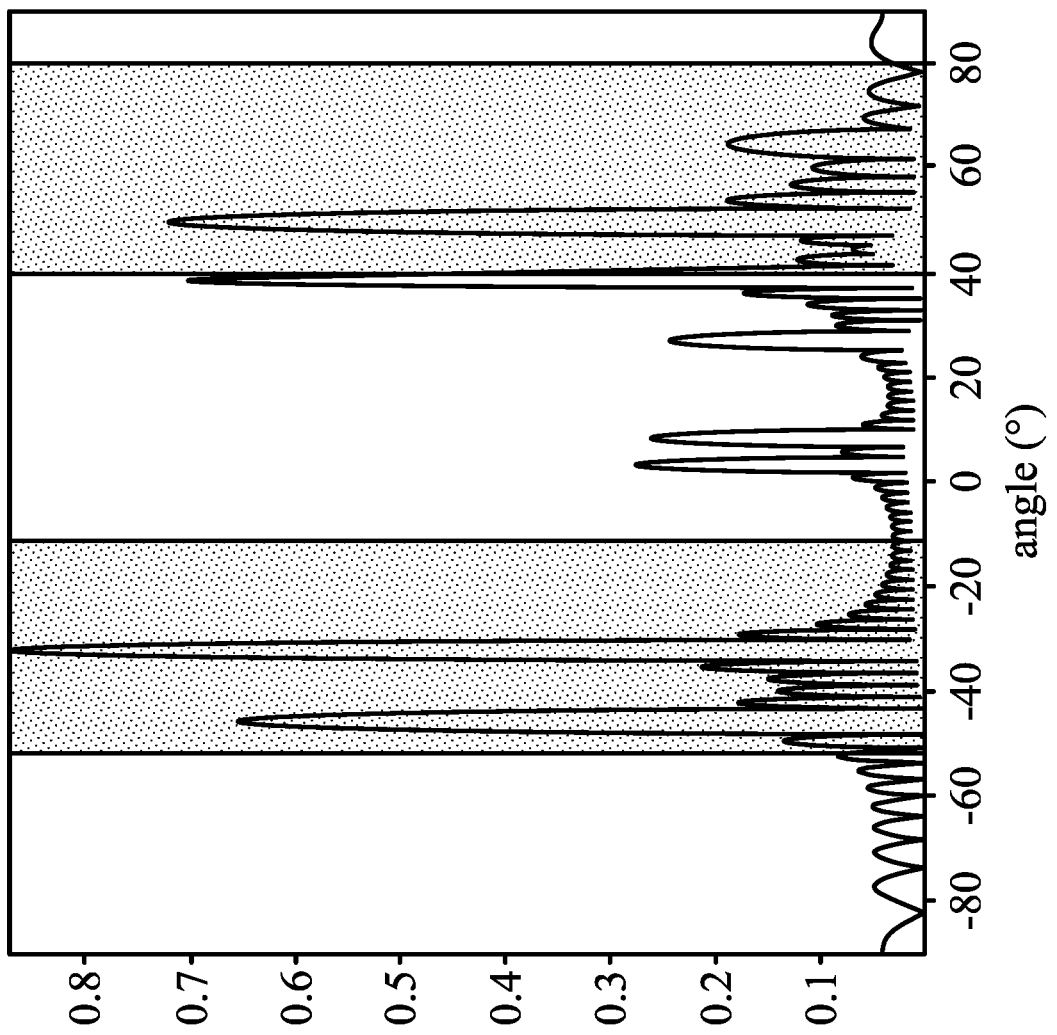
FIG. 3 is a simulation waveform diagram of the beamforming signal according to an embodiment of the present disclosure.

FIG. 3 is a simulation waveform diagram of the beamforming signal according to an embodiment of the present disclosure. In FIG. 3, it can be seen that most of the maximum values of the beamforming signal fall within −30 degrees and 60 degrees, corresponding to the piece of user equipment 150_2 and the piece of user equipment 150_5. Accordingly, the beamforming transmission device 100 may use one radio frequency unit 120 to generate the beamforming signal for the plurality of pieces of user equipment (such as the piece of user equipment 150_2 and the piece of user equipment 150_5). Therefore, the switching speed, the design complexity, and the power consumption of the beamforming transmission device 100 may be effectively reduced.

In the embodiment of FIG. 1, there is one radio frequency unit 120 and there is one signal transmission unit 130, but the embodiment of the present disclosure is not limited thereto.

Figure 4:
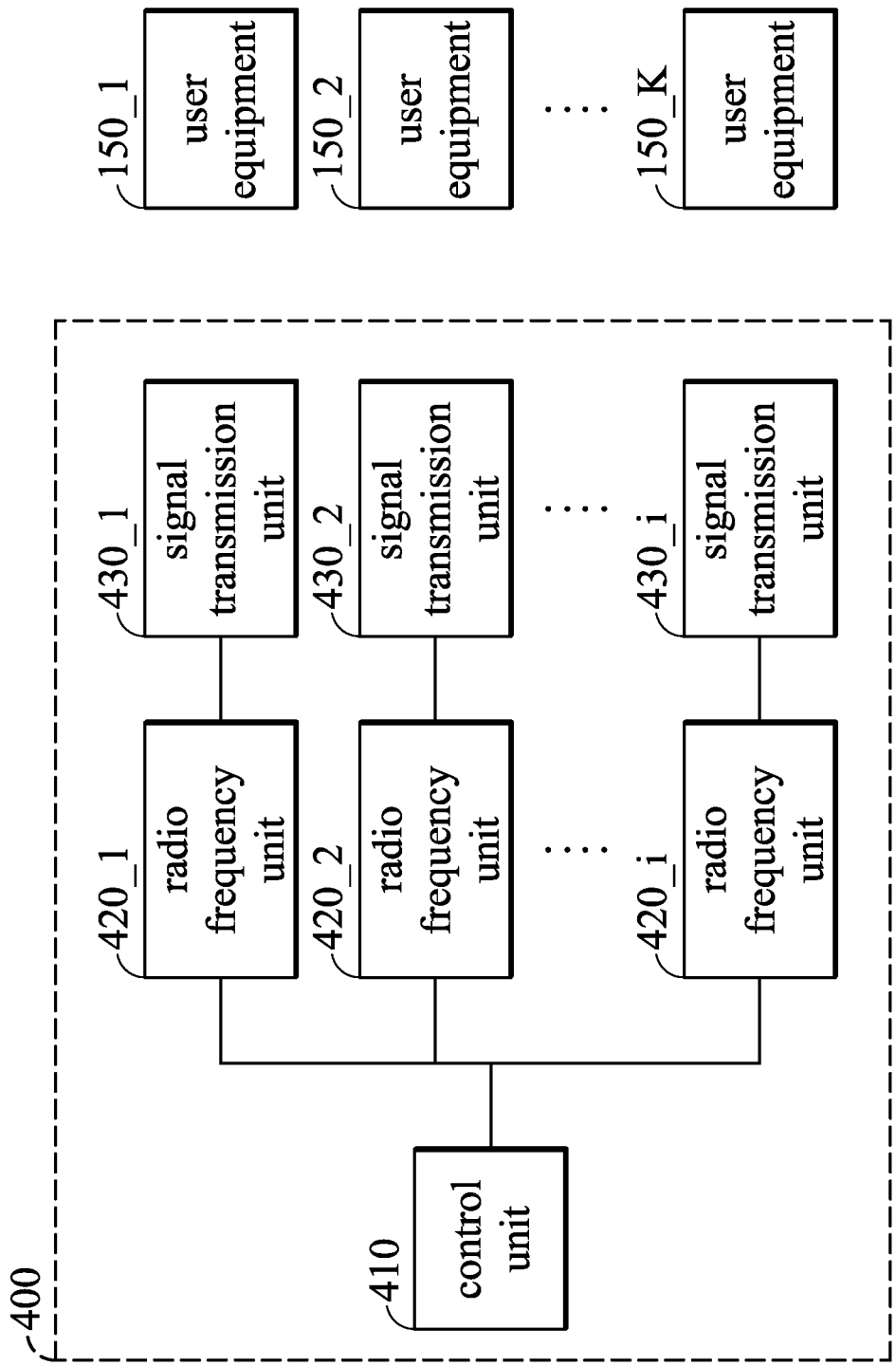
FIG. 4 is a schematic view of a beamforming transmission device according to another embodiment of the present disclosure.

FIG. 4 is a schematic view of a beamforming transmission device according to another embodiment of the present disclosure. Please refer to FIG. 4. The beamforming transmission device 400 includes a control unit 410, a plurality of radio frequency units 420_1~420_i and a plurality of signal transmission units 430_1~430_i, wherein i is a positive greater than 0 (i.e., i≥1). In the embodiment, when the number of the radio frequency unit 420_1~420_i is more than one and the number of the pieces of user equipment 150_1~150_K is more than two, the number of the radio frequency units 420_1~42_i is less than the number of the pieces of user equipment 150_1~150_K, i.e. i<K.

In the embodiment, the control unit 410 is equal to or similar to the control unit 110. Accordingly, the control unit 410 may refer to the description of the control unit 110 in FIG. 1, and the description thereof is not repeated herein.

In addition, the radio frequency units 420_1~420_i are equal to or similar to the radio frequency unit 120 in FIG. 1. Accordingly, the radio frequency units 420_1~420_i may refer to the description of the radio frequency unit 120 in FIG. 1, and the description thereof is not repeated herein. The signal transmission units 430_1~430_i and the internal elements thereof are equal to or similar to the signal transmission unit 130 in FIG. 1. Accordingly, the signal transmission units 430_1~430_i may refer to the description of the signal transmission unit 130 in FIG. 1, and the description thereof is not repeated herein. Therefore, the beamforming transmission device 400 may achieve the same effect as the beamforming transmission device 100.

Accordingly, the beamforming transmission device 400 may use lower number of radio frequency units 420_1~420_i to generate the beamforming signals for the pieces of user equipment 150_1~150_K, so as to support the plurality of pieces of user equipment 150_1~150_K. Therefore, the switching speed, design complexity, and power consumption of the beamforming transmission device 400 may be effectively reduced.

Figure 5:
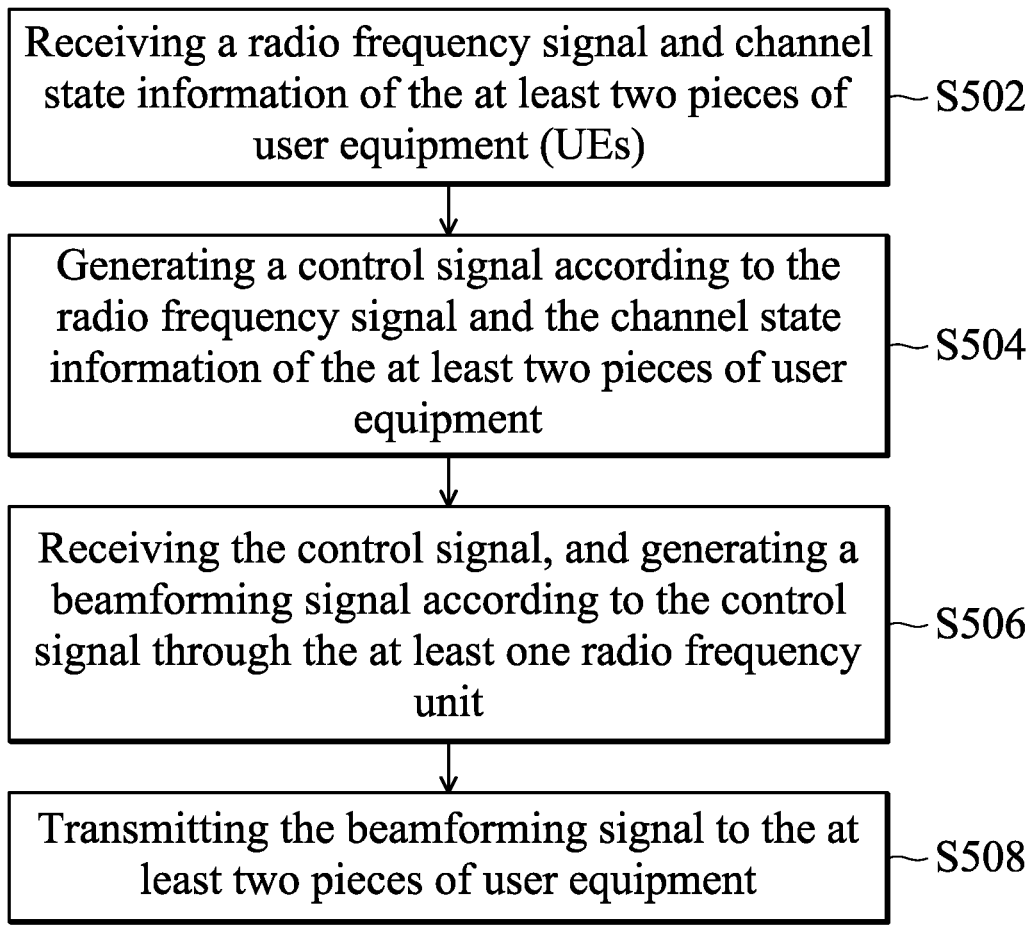
FIG. 5 is a flowchart of a beamforming transmission method according to an embodiment of the present disclosure.

According to the above-mentioned description, the above embodiments may provide a beamforming transmission method. FIG. 5 is a flowchart of a beamforming transmission method according to an embodiment of the present disclosure.

In step S502, the method involves receiving a radio frequency signal and channel state information of the at least two pieces of user equipment (UEs). In step S504, the method involves generating a control signal according to the radio frequency signal and the channel state information of the at least two pieces of user equipment.

In step S506, the method involves receiving the control signal, and generating a beamforming signal according to the control signal through the at least one radio frequency unit. In step S508, the method involves transmitting the beamforming signal to the at least two pieces of user equipment.

In the embodiment, when the number of the at least one radio frequency unit is more than one and the number of the at least two pieces of user equipment is more than two, the number of the radio frequency units is less than the number of the pieces of user equipment. The radio frequency unit is a radio frequency (RF) chain. The at least two pieces of user equipment are disposed in different positions.

Figure 6:
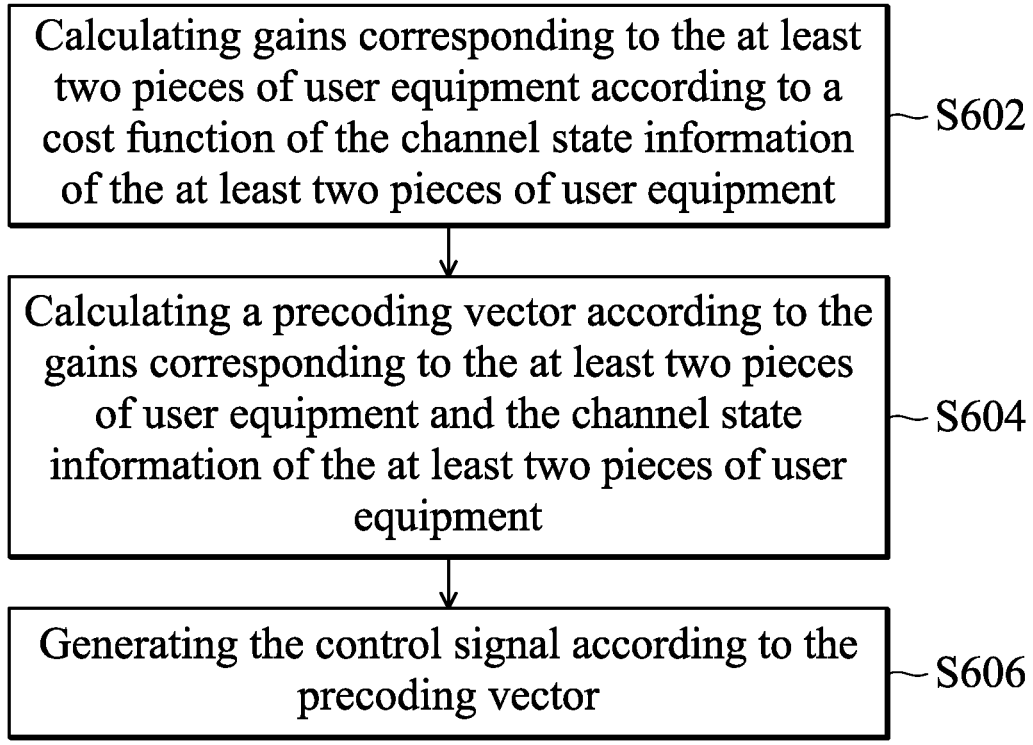
FIG. 6 is a detailed flowchart of step S504 in FIG. 5.

FIG. 6 is a detailed flowchart of step S504 in FIG. 5. In step S602, the method involves calculating gains corresponding to the at least two pieces of user equipment according to a cost function of the channel state information of the at least two pieces of user equipment. In step S604, the method involves calculating a precoding vector according to the gains corresponding to the at least two pieces of user equipment and the channel state information of the at least two pieces of user equipment. In step S606, the method involves generating the control signal according to the precoding vector.

Figure 7:
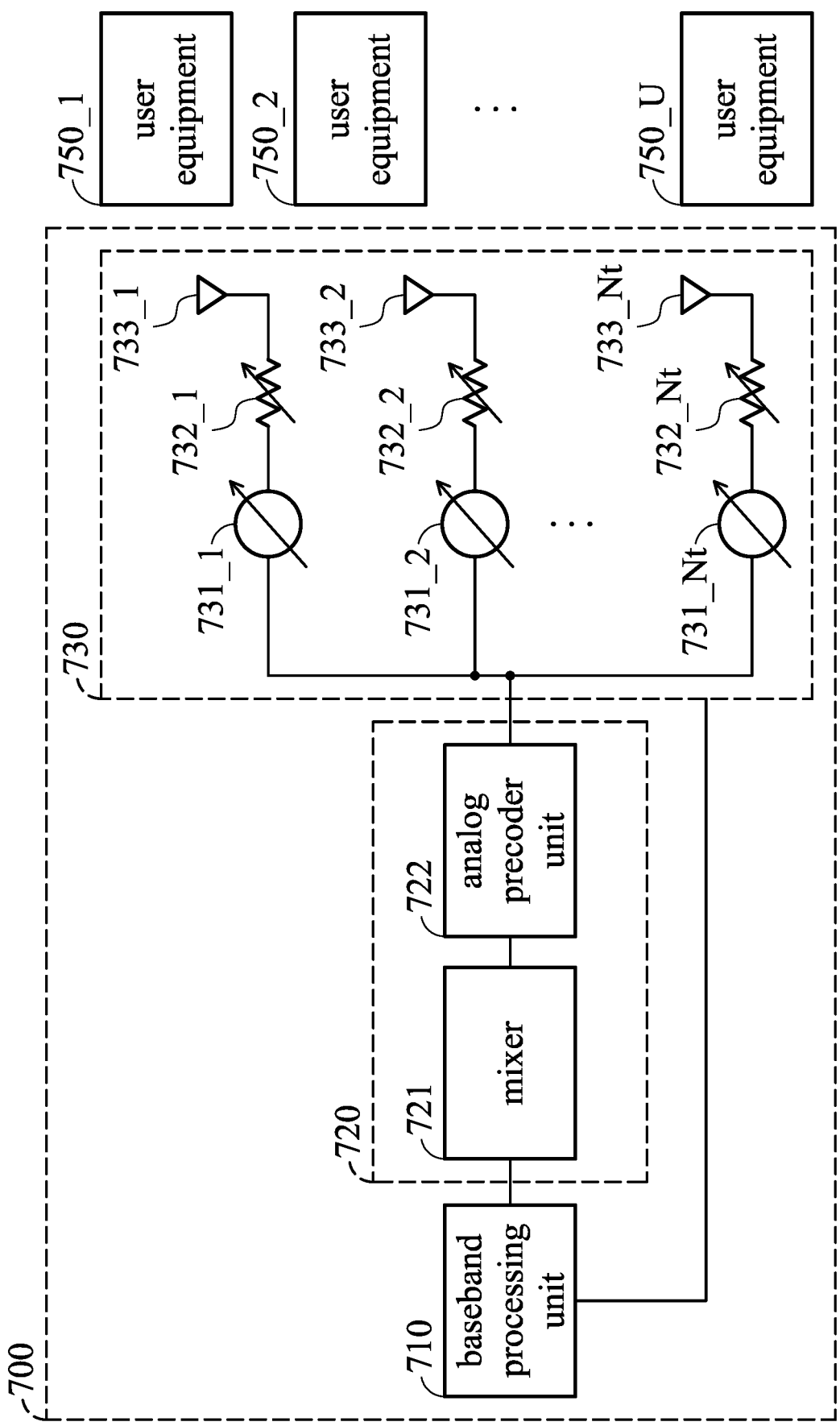
FIG. 7 is a schematic view of a beamforming transmission device according to an embodiment of the present disclosure.

FIG. 7 is a schematic view of a beamforming transmission device according to an embodiment of the present disclosure. In the embodiment, the beamforming transmission device 700 is configured to provide a shared beamforming signal to u pieces of user equipment (UEs) 750_1~750_U, wherein u is a positive integer greater than 1 (i.e., U≥2). For example, the beamforming transmission device 700 may provide the shared beamforming signal to the pieces of user equipment 750_1~750_U through a time division multiple access (TDMA), a frequency division multiple access (FDMA), a code division multiple access (CDMA) or a combination thereof. That is, the pieces of user equipment 750_1~750_U may obtain the corresponding data from the shared beamforming signal.

In some embodiments, the beamforming transmission device 700 and the pieces of user equipment 750_1~750_U may form a cluster, and the beamforming transmission device 700 is a cluster header in the cluster. In addition, the beamforming transmission device 700 may be a relay device or a communication device, for example, disposed on a mobile phone, a vehicle, a boat, a train, etc. The pieces of user equipment 750_1~750_U may be communication devices, for example, disposed on a mobile phone, a vehicle, a boat, a train, etc. The pieces of user equipment 750_1~750_U are disposed in different positions.

In some embodiments, the beamforming transmission device 700 may also be a low-orbit satellite, an unmanned aerial vehicle, a base station, etc. When the beamforming transmission device 700 is the low-orbit satellite, the unmanned aerial vehicle or the base station, the pieces of user equipment 750_1~750_U may be, for example, cluster headers. That is, after the pieces of user equipment 750_1~750_U receive the shared beamforming signal transmitted by the low-orbit satellite, the unmanned aerial vehicle or the base station, the pieces of user equipment 750_1~750_U may also be served as the beamforming transmission device 700, respectively. Then, the pieces of user equipment 750_1~750_U may also provide the shared beamforming signals to other pieces of user equipment (not shown) in the same cluster corresponding to the pieces of user equipment 750_1~750_U.

Please refer to FIG. 7. The beamforming transmission device 700 may include a baseband processing unit 710, a radio frequency unit 720 and an antenna array unit 730.

The baseband processing unit 710 may provide a data stream DS1, receive channel state information of the pieces of user equipment 750_1~750_U and generate a control signal according to the channel state information of the pieces of user equipment 750_1~750_U. In the embodiment, the above data stream DS1 may include data of the pieces of user equipment 750_1~750_U, such as $S_1^1 + S_1^2 + \ldots + S_1^U$, wherein superscripts "1~U" in $S_1^1 \sim S_1^U$ respectively indicate the first piece of user equipment 750_1 to the Uth piece of user equipment 750_U, and a subscript "1" in $S_1^1 \sim S_1^U$ indicates the data stream DS1.

The radio frequency unit 720 is coupled to the baseband processing unit 710. The radio frequency unit 720 receives the data stream and generates a radio frequency signal. In some embodiments, the radio frequency unit 720 is, for example, a radio frequency (RF) chain. In some embodiments, the radio frequency unit 720 may include a mixer 721 and an analog precoder unit 722. The mixer 721 is configured to perform a mixing process on the data stream. The analog precoder unit 722 is coupled to the mixer 721, and configured to perform an analog precoding process on the data stream to generate the radio frequency signal. The radio frequency signal may include the data of the pieces of user equipment 750_1~750_U included in the data stream DS1, such as $S_1^1 + S_1^2 + \ldots + S_1^U$.

The antenna array unit 730 is coupled to the radio frequency unit 720 and the baseband processing unit 710, and receives the radio frequency signal generated by the radio frequency unit 720 and the control signal generated by the baseband processing unit 710. The antenna array unit 730 may adjust gains and phases of the antenna array unit 730 according to the control signal such that the radio frequency signal can be formed as a shared beamforming signal. The shared beamforming signal is transmitted to the pieces of user equipment 750_1~750_U, wherein the shared beamforming signal includes the data of the pieces of user equipment 750_1~750_U.

Then, the pieces of user equipment 750_1~750_U may correspondingly receive the data from the shared beamforming signal. For example, the piece of user equipment 750_1 may receive the data $S_1^1$ from the shared beamforming signal. The piece of user equipment 750_2 may receive the data $S_1^2$ from the shared beamforming signal. . . . The piece of user equipment 750_U may receive the data $S_1^U$ from the shared beamforming signal.

In the embodiment, the antenna array unit 730 may include a plurality of phase shifters 731_1~731_Nt, a plurality of gain units 732_1~732_Nt, and a plurality of antenna units 733_1~733_Nt, wherein Nt is a positive integer greater than 1.

The phase shifters 731_1~731_Nt are coupled to the radio frequency unit 720. The phase shifters 731_1~731_Nt are configured to adjust the phase of the antenna array unit 730.

The gain units 732_1~732_Nt are correspondingly coupled to the phase shifters 731_1~731_Nt. For example, the gain unit 732_1 is correspondingly coupled to the phase shifter 731_1, the gain unit 732_2 is correspondingly coupled to the phase shifter 731_2, . . . , the gain unit 732_Nt is correspondingly coupled to the phase shifter 731_Nt. The gain units 732_1~732_Nt are configured to adjust the gain of the antenna array unit 730.

The antenna units 733_1~733_Nt are correspondingly coupled to the gain units 732_1~732_Nt. For example, the antenna unit 733_1 is correspondingly coupled to the gain unit 732_1, the antenna unit 733_2 is correspondingly coupled to the gain unit 732_2, . . . , the antenna unit 733_Nt is correspondingly coupled to the gain unit 732_Nt. The antenna units 733_1~733_Nt are configured to transmit the shared beamforming signal to the pieces of user equipment 750_1~750_U.

When the baseband processing unit 710 obtains the channel state information of the pieces of user equipment 750_1~750_U, the baseband processing unit 710 may calculate, for example, gains corresponding to the pieces of user equipment 750_1~750_U according to a cost function of the channel state information of the pieces of user equipment 750_1~750_U. In the embodiment, the channel state information of the pieces of user equipment 750_1~750_U may include the following equations: equation (19) and equation (20).

$$h_u^T = \sqrt{\frac{N_t}{L}} \sum_{l=1}^{L} \alpha_l a_t(\theta_l)^H, \qquad (19)$$

$$H = [h_1 \quad h_2 \quad \ldots \quad h_U]^T, \qquad (20)$$

wherein $h_u^T$ (u=1~U) indicates mmWave channel state information of uth piece of user equipment 750_1~750_U, H indicates a matrix of the channel information, L indicates a number of paths corresponding to each piece of user equipment, $\alpha_l$ indicates a complex gain of lth path, $\theta_l$ is an angle of departure (AOD) of lth path, $N_t$ indicates a number of antenna units 733_1~733_Nt, $a_t(\theta_l)$ indicates a steering vector with beam angle $\theta_l$, a superscript "H" in equation (19) indicates a Hermitian operation of a matrix.

In addition, $a_t$ (may be expressed by equation (21).

$$a_t(\theta_l) = \frac{1}{\sqrt{N_t}} \left[ 1, \quad e^{j\frac{2\pi}{\lambda} d \sin(\theta_l)}, \ldots, \quad e^{j(N_t-1)\frac{2\pi}{\lambda} d \sin(\theta_l)} \right]^T, \qquad (21)$$

wherein $\lambda$ indicates a wavelength of mmWave frequency, d indicates an inter-element spacing.

In some embodiments, the cost function may include a maximization of the minimum of data rates of the pieces of user equipment 750_1~750_U. In some embodiments, the cost function may include a maximization of the sum rate of the pieces of user equipment 750_1~750_U, wherein the sum rate is the total rate of individual piece of user equipment 750_1~750_U. For example, the maximization of the sum rate of the pieces of user equipment 750_1~750_U may be expressed as the following equations: equation (22) and equation (23).

$$\max \sum_{u=1}^{U} \log_2 \left( 1 + \frac{|w_u^1 h_u^T f|^2}{\sigma_n^2} \right), \qquad (22)$$

$$\text{s.t.} \quad \|f\|^2 = P_T, \qquad (23)$$

wherein u indicates the pieces of user equipment 750_1~750_U, w, indicates a postcode of uth piece of user equipment 750_1~750_U, $h_u^T$ indicates the channel state information between the beamforming transmission device 700 and uth piece of user equipment 750_1~750_U, $\sigma_n$ indicates a noise power, and $P_T$ indicates a total transmission power of the radio frequency signal. Then, the gains corresponding to the pieces of user equipment 750_1~750_U may be easily derived according to equation (22) and equation (23).

After the baseband processing unit 710 obtains the gains corresponding to the pieces of user equipment 750_1~750_U, the baseband processing unit 710 may calculate a precode according to the gains corresponding to the pieces of user equipment 750_1~750_U and the channel state information of the pieces of user equipment 750_1~750_U. In the embodiment, the precode is expressed by equation (24).

$$f = H^H(HH^H)^{-1}\begin{bmatrix} g_1 \\ g_2 \\ \vdots \\ g_U \end{bmatrix}, \quad (24)$$

wherein f indicates the precode and $f \in \mathbb{C}^{N_t \times 1}$, H indicates the mmWave channel state information of u pieces of user equipment 750_1~750_U, $g_1 \sim g_U$ indicate gains ($g_u = |w_u * h_u^T f|$) corresponding to the u pieces of user equipment 750_1~750_U.

After the baseband processing unit 710 obtains the precode, the baseband processing unit 710 may generate a control signal according to the precode, wherein the control signal may affect information related to received signals of u pieces of user equipment 750_1~750_U. In the embodiment, the received signal of uth piece of user equipment 750_1~750_U may be expressed by equation (25).

$$r_u = h_u^T f s + n_u, \quad (25)$$

wherein $r_u$ indicates the received signal of uth piece of user equipment 750_1~750_U, s indicates a symbol and $s \in \mathbb{C}^{1 \times 1}$, and $n_u$ indicates a received noise of uth piece of user equipment 750_1~750_U. Accordingly, the beamforming transmission device 700 may use one radio frequency unit 720 to generate the shared beamforming signal for the pieces of user equipment. Therefore, the design complexity and power consumption of the beamforming transmission device 700 may be effectively reduced.

In the embodiment in FIG. 7, there is one radio frequency unit 720, but the embodiment of the present disclosure is not limited thereto.

Figure 8:
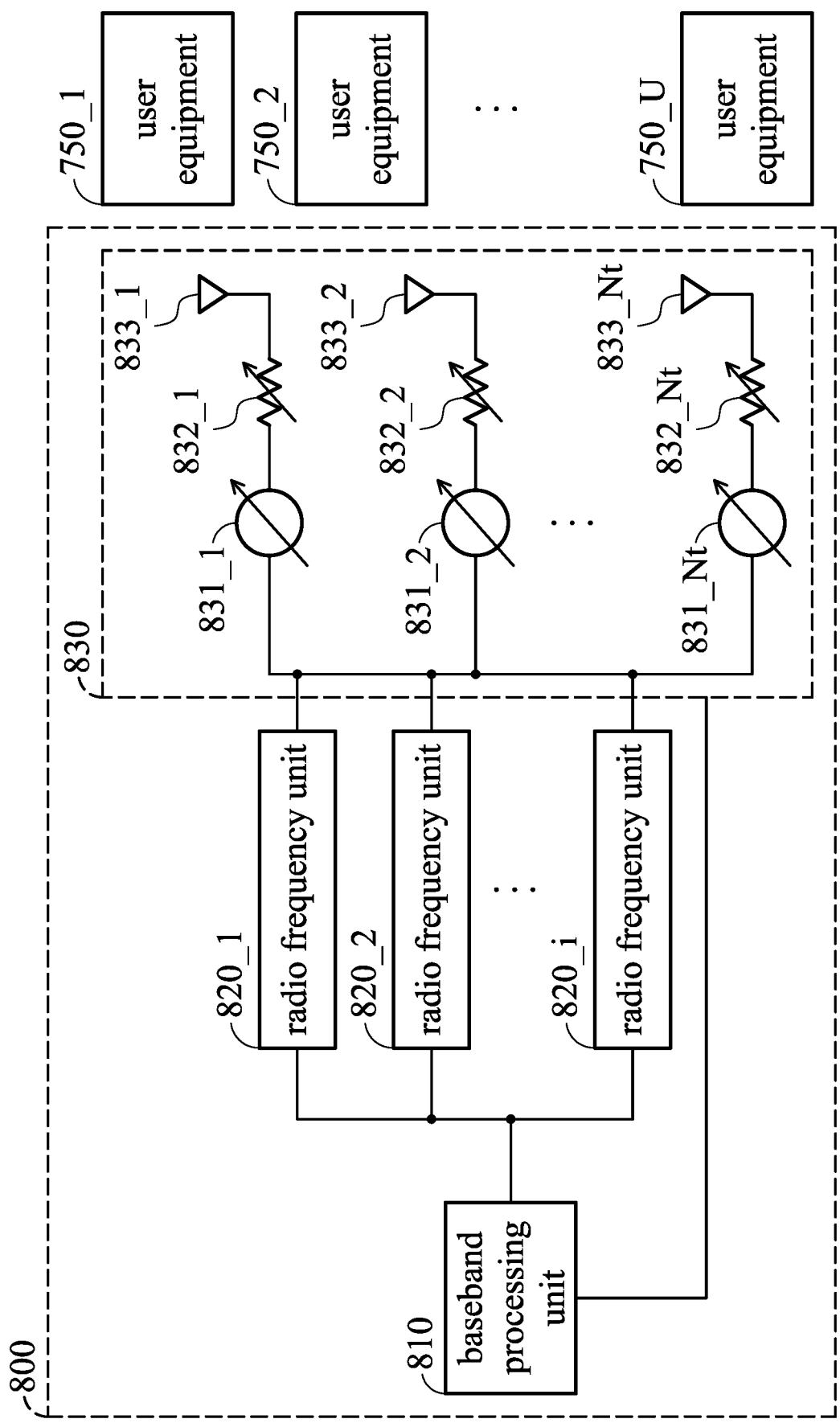
FIG. 8 is a schematic view of a beamforming transmission device according to another embodiment of the present disclosure.

FIG. 8 is a schematic view of a beamforming transmission device according to another embodiment of the present disclosure. Please refer to FIG. 8. The beamforming transmission device 800 includes a baseband processing unit 810, a plurality of radio frequency units 820_1~820_i, and an antenna array unit 830, wherein i is a positive greater than 0 (i.e., i≥1). In the embodiment, when the number of the radio frequency units 820_1~820_i is more than one and the number of the pieces of user equipment 750_1~750_U is more than two, the number of the radio frequency units 820_1~820_i is less than the number of the pieces of user equipment 750_1~750_U, i.e. i<U. The embodiment of the present disclosure is not limited thereto. When the number of the radio frequency units 820_1~820_i is more than one and the number of the pieces of user equipment 750_1~750_U is more than two, the number of the radio frequency units 820_1~820_i may also be greater than or equal to the number of the pieces of user equipment 750_1~750_U, i.e. i=U, or i.e. i>U. In this way, the same effect may also be achieved.

In the embodiment, the number of the data streams provided by the baseband processing unit 810 may correspond to the number of the radio frequency units 820_1~820_i. That is, the baseband processing unit 810 of the embodiment may provide i data streams, and the i data streams may include data of the pieces of user equipment 750_1~750_U, respectively.

In addition, the i data streams provided by the baseband processing unit 810 are respectively transmitted to the radio frequency units 820_1~820_i to correspondingly generate i radio frequency signals. For example, the first data stream DS1 provided by the baseband processing unit 810 is transmitted to the radio frequency unit 820_1 to generate a first radio frequency signal. In the embodiment, the first radio frequency signal may include the data of the pieces of user equipment 750_1~750_U corresponding to the first data stream DS1, such as $S_1^1 + S_1^2 + \ldots + S_1^U$, wherein superscripts "1~U" in $S_1^1 \sim S_1^U$ respectively indicate the first piece of user equipment 750_1 to the Uth piece of user equipment 750_U, and a subscript "1" in $S_1^1 \sim S_1^U$ indicates the first data stream DS1.

The second data stream DS2 provided by the baseband processing unit 810 is transmitted to the radio frequency unit 820_2 to generate a second radio frequency signal. In the embodiment, the second radio frequency signal may include the data of the pieces of user equipment 750_1~750_U corresponding to the second data stream DS2, such as $S_2^1 + S_2^2 + \ldots + S_2^U$, wherein superscripts "1~U" in $S_2^1 \sim S_2^U$ respectively indicate the first piece of user equipment 750_1 to the Uth piece of user equipment 750_U and a subscript "2" in $S_2^1 \sim S_2^U$ indicates the second data stream DS2. . . .

The ith data stream DSi provided by the baseband processing unit 810 is transmitted to the radio frequency unit 820_i to generate a ith radio frequency signal. In the embodiment, the ith radio frequency signal may include the data of the pieces of user equipment 750_1~750_U corresponding to the ith data stream DSi, such as $S_i^1 + S_i^2 + \ldots + S_i^U$, wherein superscripts "1~U" in $S_i^1 \sim S_i^U$ respectively indicate the first piece of user equipment 750_1 to the Uth piece of user equipment 750_U, and a subscript "i" in $S_i^1 \sim S_i^U$ indicates the ith data stream DSi.

Furthermore, the radio frequency units 820_1~820_i and the internal circuits thereof are equal to or similar to the radio frequency unit 720 in FIG. 7. Accordingly, the radio frequency units 820_1~820_i and the internal circuits thereof in FIG. 8 may refer to the description of the radio frequency unit 720 in FIG. 7, and the description thereof is not repeated herein.

The antenna array unit 830 is coupled to the radio frequency units 820_1~820_i and the baseband processing unit 810. In the embodiment, the coupling manner of the radio frequency units 820_1~820_i and the antenna array unit 830 is, for example, a fully-connected manner. The antenna array unit 830 receives i radio frequency signals and a control signal, and adjusts gains and phases of the antenna array unit 830 according to the control signal such that the i radio frequency signals can be formed as a shared beamforming signal, and the shared beamforming signal is transmitted to the pieces of user equipment 750_1~750_U, wherein the shared beamforming signal includes the data of the pieces of user equipment 750_1~750_U.

That is, the antenna array unit 830 may form i radio frequency signals into the shared beamforming signal, such that the shared beamforming signal may include the data of the pieces of user equipment 750_1~750_U included in the i radio frequency signals, such as $S_1^1+S_1^2+\ldots+S_1^U$, $S_2^1+S_2^2+\ldots+S_2^U, \ldots, S_i^1+S_i^2+\ldots+S_i^U$. In addition, the antenna array unit 830 may transmit the above shared beamforming signal to the pieces of user equipment 750_1~750_U.

Then, the pieces of user equipment 750_1~750_U may correspondingly receive the data from the shared beamforming signal. For example, the piece of user equipment 750_1 may receive the data $S_1^1, S_2^1, \ldots, S_i^1$ from the shared beamforming signal. The piece of user equipment 750_2 may receive the data $S_1^2, S_2^2, \ldots, S_i^2$ from the shared beamforming signal. ... The piece of user equipment 750_U may receive the data $S_1^U, S_2^U, \ldots, S_i^U$ from the shared beamforming signal.

In the embodiment, the antenna array unit 830 may include a plurality of phase shifters 831_1~831_Nt, a plurality of gain units 832_1~832_Nt, and a plurality of antenna units 833_1~833_Nt. The phase shifters 831_1~831_Nt, the gain units 832_1~832_Nt, and the antenna units 833_1~833_Nt of the antenna array unit 830 in FIG. 8 are equal to or similar to the phase shifters 731_1~731_Nt, the gain units 732_1~732_Nt, and the antenna units 733_1~733_Nt of the antenna array unit 730 in FIG. 7. Accordingly, phase shifters 831_1~831_Nt, the gain units 832_1~832_Nt, and the antenna units 833_1~833_Nt of the antenna array unit 830 in FIG. 8 may refer to the description of the phase shifters 731_1~731_Nt, the gain units 732_1~732_Nt, and the antenna units 733_1~733_Nt of the antenna array unit 730 in FIG. 7, and the description thereof is not repeated herein.

When the baseband processing unit 810 obtains the channel state information of the pieces of user equipment 750_1~750_U, the baseband processing unit 810 may calculate, for example, the gains corresponding to the pieces of user equipment 750_1~750_U according to a cost function of the channel state information of the pieces of user equipment 750_1~750_U. In some embodiments, the cost function may, for example, include a maximization of the sum rate of the pieces of user equipment 750_1~750_U. For example, the maximization of the sum rate of the pieces of user equipment 750_1~750_U may be expressed by the following equation (26).

$$\{B'_u, F'\} = \arg\max_{B_u, F} \kappa \sum_{u=1}^{U} \log_2 \left| I + \frac{\sigma_s^2}{\sigma_n^2} H_u F B_u B_u^H F^H H_u^H \right| \quad (26)$$

$$\text{s.t. } \|FB_u\|_F^2 = P_T$$

wherein of $B'_u$ of $\{B'_u, F'\}$ indicates a baseband precode of the uth piece of user equipment 750_1~750_U that may achieve the maximization of the sum rate, F' of $\{B'_u, F'\}$ indicates a precode of gains and phases of antenna array unit 830 that may achieve the maximization of the sum rate, u indicates the pieces of user equipment 750_1~750_U, I indicates an identity matrix, $H_u$ indicates the channel state information between the beamforming transmission device 800 and uth piece of user equipment 750_1~750_U, $B_u$ indicates the baseband precode of the uth piece of user equipment 750_1~750_U, F indicates the precode of gains and phases of antenna array unit 830, $\sigma_s$ indicates a symbol power, $\sigma_n$ indicates a noise power, $P_T$ indicates the total transmission power of the radio frequency signal, and $\kappa$ indicates a normalized scalar. Furthermore, in a scheme of time division multiple access, $\kappa$ may be set to 1/U, for example. Then, the gains corresponding to the pieces of user equipment 750_1~750_U may be obtained according to equation (26). After the baseband processing unit 810 obtains the gains corresponding to the pieces of user equipment 750_1~750_U, the baseband processing unit 810 may calculate a precode according to the gains corresponding to the pieces of user equipment 750_1~750_U and the channel state information of the pieces of user equipment 750_1~750_U. After the baseband processing unit 810 obtains the precode, the baseband processing unit 810 may generate a control signal according to the precode.

Accordingly, the beamforming transmission device 800 may use lower number of radio frequency units 820_1~820_i to generate the shared beamforming signal for the pieces of user equipment 750_1~750_U, so as to support all pieces of user equipment 750_1~750_U. In addition, the beamforming transmission device 800 may also support the plurality of radio frequency units and the plurality of data streams, such that the beamforming transmission device 800 may serve the plurality of pieces of user equipment. Furthermore, when the number of radio frequency units 820_1~820_i and data streams DS1~DSi increases, the data rate of the data received by the pieces of user equipment 750_1~750_U may also be increased. Therefore, the design complexity and power consumption of the beamforming transmission device 800 may be effectively reduced.

In some embodiments, the number of beamforming transmission devices 800 may be N, and the N beamforming transmission devices 800 may also group the pieces of user equipment 750_1~750_U, for example, in N clusters, according to the cost function. Then, the N beamforming transmission devices 800 may provide the corresponding shared beamforming signals to the pieces of user equipment 750_1~750_U of the N clusters. That is, the nth beamforming transmission device 800 may correspond to the nth cluster, so as to provide the shared beamforming signal to the pieces of user equipment of the nth cluster, wherein n=1, 2, 3, . . . , N. In addition, the pieces of user equipment between the N clusters may not be the same.

In some embodiments, the cost function may include, for example, a maximization of the sum rate of the pieces of user equipment 750_1~750_U. For example, the maximization of the sum rate of the pieces of user equipment 750_1~750_U may be expressed as the following equations: equation (27) and equation (28).

$$C^{(n)} = \kappa \sum_{u=1}^{U/N} \log_2 \left( 1 + \frac{\left| h_{\Gamma(n,u)}^{(n)H} F^{(n)} b_{\Gamma(n,u)} \right|^2}{\sum_{\substack{m=1 \\ \neq n}}^{N} \left| h_{\Gamma(n,u)}^{(m)H} F^{(m)} b_{\Gamma(m,u)} \right|^2 + \sigma_n^2} \right), \quad (27)$$

$$\{F^{(n)\prime}, b'_{\Gamma(n,u)}\} = \arg\max_{F^{(n)}, b_{\Gamma(n,u)}} \sum_{n=1}^{N} C^{(n)} \quad (28)$$

$$n = 1, 2, 3 \ldots N, u = 1, 2, 3 \ldots U/N,$$

wherein n indicates the clusters, $C^{(n)}$ indicates the sum rate of the pieces of user equipment of the nth cluster, $\kappa$ indicates a normalized scalar, u indicates the pieces of user equipment 750_1~750_U, $h_{\Gamma(n,u)}^{(k)H}$ indicates the channel between the kth beamforming transmission device and the piece of user equipment corresponding to the $\Gamma(n, u)$ matrix, $F^{(n)}$ indicates an analog precode designed by the nth beamforming transmission device for all pieces of user equipment in the nth cluster, $b_{\Gamma(n,u)}$ indicates a baseband precode designed by the nth beamforming transmission device for the piece of user equipment corresponding to the $\Gamma(n,u)$ matrix, $\sigma_n$ indicates a noise power, $F^{(n)\prime}$ of $\{F^{(n)\prime}, b_{\Gamma(n,u)}{}'\}$ indicates an analog precode designed by the nth beamforming transmission device that may achieve the maximization of the sum rate for all pieces of user equipment in the nth cluster, and $b_{\Gamma(n,u)}{}'$ of $\{F^{(n)\prime}, b_{\Gamma(n,u)}{}'\}$ indicates a baseband precode designed by the nth beamforming transmission device that may achieve the maximization of the sum rate for the piece of user equipment corresponding to the $\Gamma(n,u)$ matrix.

For example, assume that $\Gamma(2,3)=11$, the piece of user equipment corresponding to the $\Gamma(2,3)$ matrix is, for example, the third piece of user equipment in the second cluster, and "11" is, for example, the piece of user equipment 750_11, i.e., the third piece of user equipment in the second cluster is the piece of user equipment 750_11. Assume that $\Gamma(1,5)=6$, the piece of user equipment corresponding to the $\Gamma(1,5)$ matrix is, for example, the fifth piece of user equipment in the first cluster, and "6" is, for example, the piece of user equipment 750_6, i.e., the fifth piece of user equipment in the first cluster is the piece of user equipment 750_6. Assume that $\Gamma(3,4)=1$, the piece of user equipment corresponding to the $\Gamma(3,4)$ matrix is, for example, the fourth piece of user equipment in the third cluster, and "1" is, for example, the piece of user equipment 750_1, i.e., the fourth piece of user equipment in the third cluster is the piece of user equipment 750_1. The other pieces of user equipment corresponding to the $\Gamma(n, u)$ matrix may be deduced by analogy from the description of the above embodiment. $h_{r(2,3)}^{(7)H}$ indicates the channel between the seventh beamforming transmission device and the third piece of user equipment of the second cluster corresponding to the $\Gamma(2,3)$ matrix (such as the piece of user equipment 750_11). $b_{\Gamma(2,3)}$ indicates the baseband precode designed by the second beamforming transmission device for the third piece of user equipment of the second cluster corresponding to the $\Gamma(2,3)$ matrix (such as the piece of user equipment 750_11). In addition, in a scheme of time division multiple access, κ may be set, for example, $$\frac{1}{U/N}.$$

Figure 9:
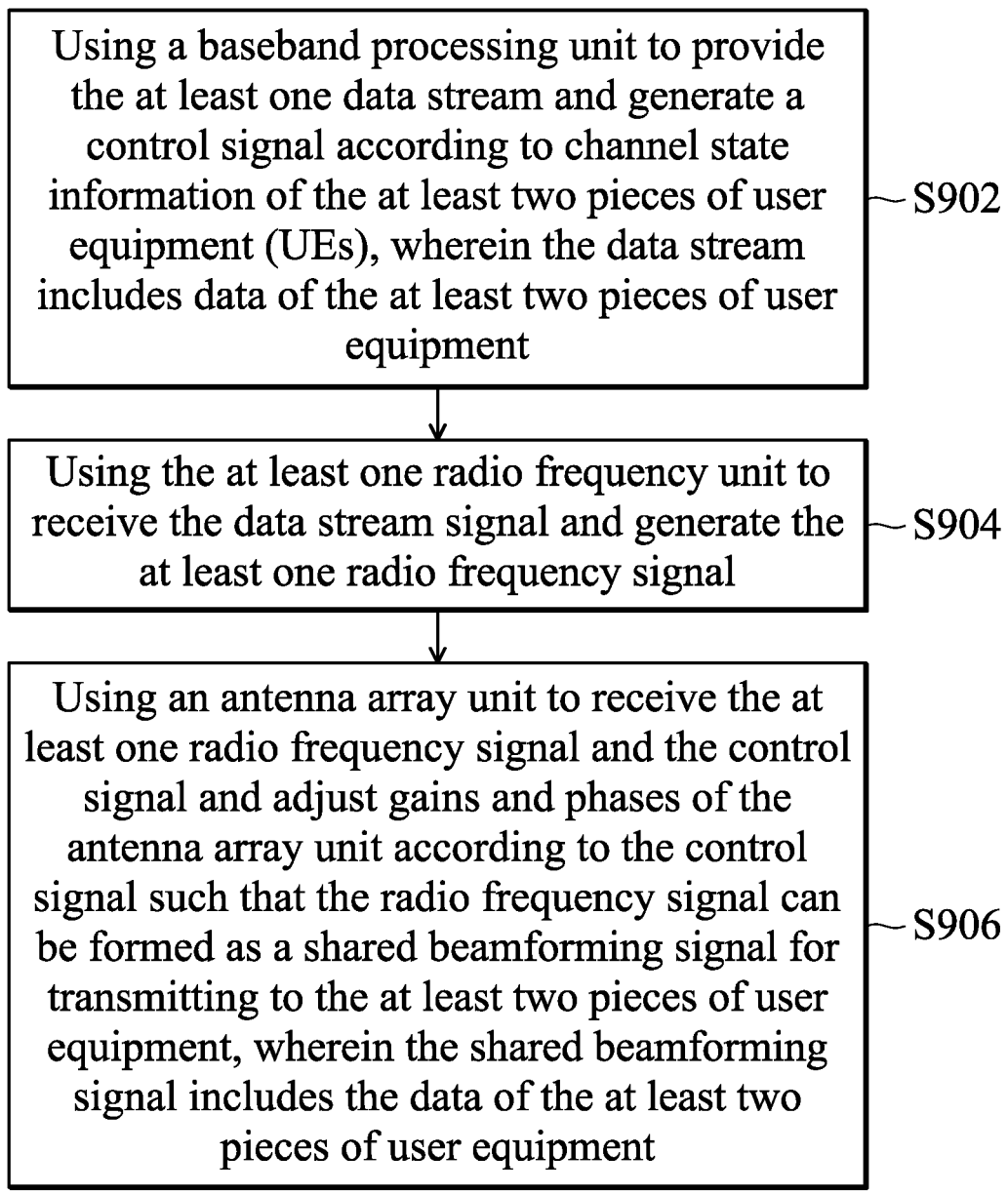
FIG. 9 is a flowchart of a beamforming transmission method according to an embodiment of the present disclosure.

According to the above-mentioned description, the above embodiments may provide a beamforming transmission method. FIG. 9 is a flowchart of a beamforming transmission method according to an embodiment of the present disclosure.

In step S902, the method involves using a baseband processing unit to provide the at least one data stream and generate a control signal according to channel state information of the at least two pieces of user equipment (UEs), wherein the data stream includes data of the at least two pieces of user equipment. In step S904, the method involves using the at least one radio frequency unit to receive the data stream signal and generate the at least one radio frequency signal. In step S906, the method involves using an antenna array unit to receive the at least one radio frequency signal and the control signal and adjust gains and phases of the antenna array unit according to the control signal such that the radio frequency signal can be formed as a shared beamforming signal for transmitting to the at least two pieces of user equipment, wherein the shared beamforming signal includes the data of the at least two pieces of user equipment.

In the embodiment, when the number of the at least one radio frequency unit is more than one and the number of the at least two pieces of user equipment is more than two, the number of the radio frequency units is less than the number of the pieces of user equipment. The number of data stream corresponds to the number of radio frequency unit. The frequency unit is a radio frequency (RF) chain. The at least two pieces of user equipment are disposed in different positions.

Figure 10:
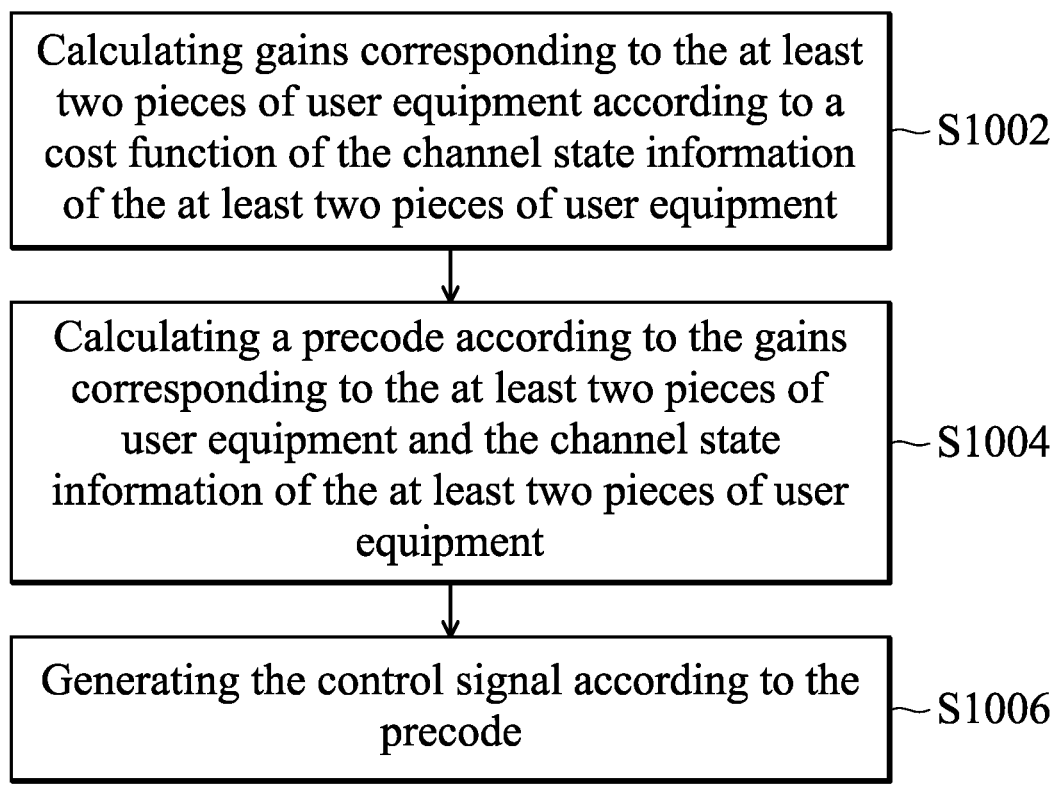
FIG. 10 is a detailed flowchart of step S902 in FIG. 9.

FIG. 10 is a detailed flowchart of step S902 in FIG. 9. In step S1002, the method involves calculating gains corresponding to the at least two pieces of user equipment according to a cost function of the channel state information of the at least two pieces of user equipment. In step S1004, the method involves calculating a precode according to the gains corresponding to the at least two pieces of user equipment and the channel state information of the at least two pieces of user equipment. In step S1006, the method involves generating the control signal according to the precode.

In summary, according to the beamforming transmission device and method disclosed by the embodiments of the present disclosure, the baseband processing unit provides the at least one data stream and generates a control signal according to the channel state information of the pieces of user equipment. Therefore, the embodiment of the present disclosure may use the lower number of radio frequency units to support the pieces of user equipment, and the switching speed, design complexity, and power consumption of the beamforming transmission device may be effectively reduced. Then, the radio frequency unit receives the data stream signal and generates the at least one radio frequency signal. Afterward, the antenna array unit adjusts the gains and the phases of the antenna array unit according to the control signal, such that the radio frequency signal can be formed as a shared beamforming signal, and the shared beamforming signal is transmitted to the pieces of user equipment, wherein the shared beamforming signal includes the data of the pieces of user equipment. In addition, the number of data streams corresponds to the number of radio frequency units, so as to support the plurality of radio frequency units and the plurality of data streams to serve the plurality of pieces of user equipment. Therefore, the embodiment of the present disclosure may use the lower number of radio frequency units to provide the shared beamforming signal to support the plurality of pieces of user equipment, and the design complexity and power consumption of the beamforming transmission device may be effectively reduced.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A beamforming transmission device, comprising:
   a baseband processing circuit, configured to provide at least one data stream and generate a control signal according to channel state information of at least two pieces of user equipment (UEs), wherein the data stream comprises data of the at least two pieces of user equipment;

at least one radio frequency circuit, coupled to the baseband processing circuit, and configured to receive the data stream signal and generate at least one radio frequency signal; and an antenna array circuit, coupled to the baseband processing circuit and the at least one radio frequency circuit, and configured to receive the control signal and the at least one radio frequency signal and adjust gains and phases of the antenna array circuit according to the control signal such that the radio frequency signal is formed as a shared beamforming signal for transmitting to the at least two pieces of user equipment, wherein the shared beamforming signal comprises the data of the at least two pieces of user equipment;

wherein the baseband processing circuit is further configured to calculate gains corresponding to the at least two pieces of user equipment according to a cost function of the channel state information of the at least two pieces of user equipment, and next calculate a precode according to the gains corresponding to the at least two pieces of user equipment and the channel state information of the at least two pieces of user equipment, and then generate the control signal according to the precode.

2. The beamforming transmission device as claimed in claim 1, wherein when a number of the at least one radio frequency circuit is more than one and a number of the at least two pieces of user equipment is more than two, the number of the radio frequency circuits is less than the number of the pieces of user equipment.

3. The beamforming transmission device as claimed in claim 1, wherein a number of the at least one data stream corresponds to a number of the at least one radio frequency circuit.

4. The beamforming transmission device as claimed in claim 1, wherein the antenna array circuit comprises:

a plurality of phase shifters, coupled to the at least one radio frequency circuit, and configured to adjust the phases of the antenna array circuit;

a plurality of gain circuits, correspondingly coupled to the phase shifters, and configured to adjust the gains of the antenna array circuit; and a plurality of antenna circuits, correspondingly coupled to the gain circuits, and configured to transmit the shared beamforming signal to the at least two pieces of user equipment.

5. The beamforming transmission device as claimed in claim 1, wherein the at least one radio frequency circuit comprises:

a mixer, configured to perform a mixing process on the data stream; and an analog precoder circuit, coupled to the mixer, and configured to perform an analog precoding process on the data stream.

6. The beamforming transmission device as claimed in claim 1, wherein the cost function comprises a maximization of a sum rate of the at least two pieces of user equipment or a maximization of the minimum of data rates of the at least two pieces of user equipment.

7. The beamforming transmission device as claimed in claim 1, wherein the at least one radio frequency circuit is a radio frequency (RF) chain.

8. The beamforming transmission device as claimed in claim 1, wherein the at least two pieces of user equipment are disposed in different positions.

9. A beamforming transmission method, comprising:

using a baseband processing circuit to provide at least one data stream and generate a control signal according to channel state information of at least two pieces of user equipment (UEs), wherein the data stream comprises data of the at least two pieces of user equipment;

using at least one radio frequency circuit to receive the data stream signal and generate at least one radio frequency signal; and using an antenna array circuit to receive the control signal and the at least one radio frequency signal and adjust gains and phases of the antenna array circuit according to the control signal such that the radio frequency signal is formed as a shared beamforming signal for transmitting to the at least two pieces of user equipment, wherein the shared beamforming signal comprises the data of the at least two pieces of user equipment;

wherein the steps of generating the control signal according to the channel state information of the at least two pieces of user equipment comprise:

calculating gains corresponding to the at least two pieces of user equipment according to a cost function of the channel state information of the at least two pieces of user equipment;

calculating a precode according to the gains corresponding to the at least two pieces of user equipment and the channel state information of the at least two pieces of user equipment; and generating the control signal according to the precode.

10. The beamforming transmission method as claimed in claim 9, wherein when a number of the at least one radio frequency circuit is more than one and a number of the at least two pieces of user equipment is more than two, the number of the radio frequency circuits is less than the number of the pieces of user equipment.

11. The beamforming transmission method as claimed in claim 9, wherein a number of the at least one data stream corresponds to a number of the at least one radio frequency circuit.

12. The beamforming transmission method as claimed in claim 9, wherein the cost function comprises a maximization of a sum rate of the at least two pieces of user equipment or a maximization of the minimum of data rates of the at least two pieces of user equipment.

13. The beamforming transmission method as claimed in claim 9, wherein the at least one radio frequency circuit is a radio frequency (RF) chain.

14. The beamforming transmission method as claimed in claim 9, wherein the at least two pieces of user equipment are disposed in different positions.

* * * * *